United States Patent Office 2,847,276
Patented Aug. 12, 1958

2,847,276

SOLVENT EXTRACTION OF NEPTUNIUM

John P. Butler, Deep River, Canada, assignor, by mesne assignments, to the United States of America as represented by the United States Atomic Energy Commission No Drawing. Application April 15, 1955
Serial No. 501,740

1 Claim. (Cl. 23—14.5)

This invention relates to the recovery of the actinide element neptunium from solutions containing various actinide and fission products, by solvent extraction.

Because of its scarcity it is important to be able to efficiently extract neptunium from such solutions in good yield. Precipitation methods, heretofore known, are difficult to carry out on a large scale and even when the method is repeated several times the yield is relatively low. Neptunium has been extracted by the solvent α-thenoyltrifluoracetone in benzene. This solvent is unstable and decomposes producing fluoride ions. It has been found to also extract the fission product zirconium and is thus not sufficiently selective. It is expensive.

The object of the present invention is to provide a solvent extraction method which is conveniently and economically carried out in large scale operations with a high yield of neptunium and good decontamination from fission products and plutonium.

The solvent used in the method of the invention is tributyl phosphate in an inert organic solvent carrier, such as turpolene, benzene, carbon tetrachloride, kerosene or the like. The preferred concentration of the partitioning agent, tributyl phosphate, in the solvent is 20 to 30% by volume. This has been found to give very efficient separation. Neptunium in the tetra or hexavalent state is extracted from aqueous nitric acid solutions in which the preferred nitric acid concentration is 5 N. A reducing agent may be added to maintain the neptunium in the tetravalent state and the plutonium in the trivalent state in order to effect their separation. The preferred reducing agent is ferrous ion, as ferrous sulphamate, but hydroxylamine or sulphurous acid may be used. The ratio of ferrous to ferric ion in the aqueous medium should be greater than 5 for best results. With a reducing agent present the neptunium is extracted into the organic phase while the plutonium and fission products remain in the aqueous phase.

The organic phase is then scrubbed with an aqueous nitric acid solution containing a reducing agent, preferably ferrous ion. The preferred concentration is 4 N in nitric acid and 0.1 M per litre in ferrous ion. Higher nitric acid concentration tends to oxidize the small fraction of plutonium remaining to tetravalent plutonium which is extracted by the dibutyl phosphate. This scrubbing may be repeated in order to provide the desired purity of separation. The neptunium is then back washed into water. The method is best suited to column operation.

When uranium is present in the nitrate solution under treatment it follows the neptunium and may be separated therefrom: for example it may be removed from the neptunium by backwashing the mixture with dilute nitric acid of a concentration of about 0.6 N, instead of water as above described. In this case the uranium remains essentially in the organic phase. If the original solution to be treated contains uranium at a concentration of, for example, 1 M it is best to first extract the uranium in any desired way. A preferred method is extraction with hexone using zinc nitrate as the salting out agent.

The following examples are illustrative of the method of the invention.

(1) 200 ml. of nitric acid solution, containing $7.2 \times 10^4$ DPM of $Np^{237}$, $3.3 \times 10^8$ DPM of $Pu^{239}$, $6.2 \times 10^8$ β-γ DPM and 5.0 grams of uranium (25 mg./ml.) were extracted with one equal and two half volumes of 30% tributyl phosphate in turpolene in the presence of 0.1 M of ferrous ion. The organic phase was analysed and shown to contain 99% of the original neptunium, 59% of the original plutonium, 100% of the original uranium and 6% of the original fission product activity. This phase was scrubbed with one half volume of a solution 4 N in nitric acid and 0.1 M in ferrous ion. The resulting organic phase contained: 90.3% of the original neptunium, 7.8% of the original Pu, 0.5% of the original fission product activity and 99% of the original uranium. The organic phase was further scrubbed with two one half volume ferrous solutions. It was then washed with water, one equal volume and two half volumes. The resulting aqueous solution contained 73% of the original neptunium, 0.13% of the original plutonium, 81% of the original uranium and 0.5% of the original fission product activity.

(2) 50 ml. of a nitric acid solution containing $6.7 \times 10^3$ DPM of $Np^{237}$, $1.98 \times 10^7$ α DPM of plutonium, americium and curium (84% of the α activity being due to Pu), 2.98 gms. (60 mg./ml.) of uranium and $2.6 \times 10^{11}$ β-γ DPM due to fission products were treated as described in Example 1. The resulting aqueous solution contained 74% of the original neptunium, 0.06% of the original Pu, Am and Cm α activity and 0.05% of the original β-γ activity.

It will be observed that the fission product decontamination in the above cases is quite different. In the former example, the solution used had been previously freed of some fission products while in the latter example, the solution contained the normal distribution of fission products associated with irradiated uranium. The decontamination obtained in Example 2 thus indicates the level of decontamination which may be obtained when neptunium is extracted from irradiated uranium by this solvent extraction procedure. It should be noted that the neptunium-plutonium ratio is increased by a factor of about 10 for each half volume ferrous scrub. The neptunium lost in the ferrous scrubs is readily recovered by re-extraction from the aqueous solution containing the reducing agent with fresh tributyl phosphate.

It should be observed that the method is well adapted for the recovery of neptunium from nitrate solutions of irradiated uranium. Even if the solution is high in uranium (about 70 mg./ml.) the uranium, plutonium, and neptunium are extracted into the organic phase. When this phase is treated with dilute nitric acid, preferably not more than 0.6 N, containing the reducing agent the neptunium and plutonium appear in the aqueous phase. The acidity of the aqueous phase may then be increased to about 4 N in nitric acid and retreated with the partitioning agent to extract the neptunium. Scrubbing of this extract with 4 N nitric acid solution containing a reducing agent, such as ferrous ion, removes plutonium. The neptunium is finally removed by backwashing with water.

It will be observed that the method separates the actinides neptunium, uranium and plutonium from one another and from fission products.

What is claimed is:

A method of extracting neptunium values from aqueous nitrate solutions, which are about 5 N in nitric acid and about 0.1 M in ferrous ion and containing neptunium, other actinides and fission products which comprises treating the solution with tributyl phosphate in an inert organic solvent, separating the organic phase from the aqueous phase, scrubbing the organic phase with substantially 4 N aqueous nitric acid which is substantially 0.1 M in ferrous ion and washing the organic phase with water to recover the neptunium values.

References Cited in the file of this patent

UNITED STATES PATENTS

| | | |
|---|---|---|
| 2,578,416 | Fried | Dec. 11, 1951 |
| 2,683,655 | Peppard | July 13, 1954 |

OTHER REFERENCES

Meinke: "Chemical Procedures Used in Bombardment at Berkeley," AECD–3084, pages 93–1 and 93–2; Declassified Mar. 15, 1951. (Copy available from Technical Information Service, Oak Ridge, Tenn.)

Glasstone et al.: "Elements of Nuclear Reactor Theory," page 40, D. Van Nostrand Co. (1952).

Emeleus: "Science Progress," vol. 38, page 610, October 1950.

Wright, Jr.: AEC Document Y–884, May 7, 1952; declassified Oct. 18, 1954.